(12) United States Patent
Kleinikkink et al.

(10) Patent No.: US 10,670,079 B2
(45) Date of Patent: Jun. 2, 2020

(54) LINEAR MOTOR CONVEYOR SYSTEM, BEARING SYSTEM AND SYSTEM AND METHOD OF LUBRICATION THEREFOR

(71) Applicant: ATS AUTOMATION TOOLING SYSTEMS INC., Cambridge (CA)

(72) Inventors: Albert John Kleinikkink, Cambridge (CA); Ryan Scott, Cambridge (CA); Don Mowat, Cambridge (CA)

(73) Assignee: ATS AUTOMATION TOOLING SYSTEMS INC., Cambridge, ON (CA)

( * ) Notice: Subject to any disclaimer, the term of this patent is extended or adjusted under 35 U.S.C. 154(b) by 828 days.

(21) Appl. No.: 15/078,019

(22) Filed: Mar. 23, 2016

(65) Prior Publication Data

US 2016/0281789 A1    Sep. 29, 2016

Related U.S. Application Data

(60) Provisional application No. 62/136,800, filed on Mar. 23, 2015.

(51) Int. Cl.
*H02K 41/02* (2006.01)
*F16C 41/00* (2006.01)
(Continued)

(52) U.S. Cl.
CPC ............ *F16C 41/004* (2013.01); *B65G 45/02* (2013.01); *B65G 54/02* (2013.01); *F16C 29/005* (2013.01);
(Continued)

(58) Field of Classification Search
CPC .......... F16C 29/00; F16C 29/04; F16C 33/66; F16C 41/00; H02K 41/02; H02K 5/16; H02K 5/10; H02K 41/03; B65G 29/00
See application file for complete search history.

(56) References Cited

U.S. PATENT DOCUMENTS 3,145,065 A * 8/1964 Cator ................... F16C 29/04
                                                       384/49
4,537,285 A * 8/1985 Brown .................. B65G 45/08
                                                       184/15.2
(Continued)

FOREIGN PATENT DOCUMENTS

DE    102013218402    3/2015
EP    1476932         11/2004
(Continued)

OTHER PUBLICATIONS

European Patent Office, Search Report on EP Appln. No. 16161884.8, dated Aug. 5, 2016.
(Continued)

*Primary Examiner* — Alfonso Perez Borroto
*Assistant Examiner* — Leda T Pham
(74) *Attorney, Agent, or Firm* — Gowling WLG (Canada) LLP; Neil W. Henderson

(57) ABSTRACT

A linear motor conveyor system and method for lubrication including: a linear motor track comprising a first guide rail and a second guide rail, wherein the first guide rail has a shaped profile and the second guide rail has a flat profile; at least one moving element provided to the linear motor track comprising a first bearing having a shaped profile with a first bearing surface of polymer configured to engage the first guide rail and a second bearing having a flat profile with a second bearing surface configured to engage the second guide rail; and a lubrication system provided to one of the track and the at least one moving element and configured to provide a lubricant between the first guide rail and the first bearing surface.

19 Claims, 13 Drawing Sheets

(51) Int. Cl.
*B65G 54/02* (2006.01)
*H02K 41/03* (2006.01)
*B65G 45/02* (2006.01)
*H02K 7/08* (2006.01)
*F16C 29/00* (2006.01)
*F16C 29/04* (2006.01)
*F16C 33/66* (2006.01)
*H02K 5/16* (2006.01)
*H02K 11/21* (2016.01)
*H02K 7/09* (2006.01)
*H02K 11/33* (2016.01)

(52) U.S. Cl.
CPC ............ *F16C 29/045* (2013.01); *F16C 33/66* (2013.01); *H02K 5/16* (2013.01); *H02K 7/08* (2013.01); *H02K 41/02* (2013.01); *H02K 41/03* (2013.01); *H02K 41/031* (2013.01); *H02K 7/09* (2013.01); *H02K 11/21* (2016.01); *H02K 11/33* (2016.01)

(56) References Cited

U.S. PATENT DOCUMENTS

| | | | |
|---|---|---|---|
| 6,150,740 A | 11/2000 | Slocom | |
| 6,326,708 B1 * | 12/2001 | Tsuboi | B60L 15/005 310/12.06 |
| 8,397,896 B2 * | 3/2013 | Kleinikkink | B23Q 7/1447 198/345.3 |
| 2003/0150697 A1 | 8/2003 | Swoboda | |
| 2006/0232141 A1 * | 10/2006 | Teramachi | F16C 29/063 310/12.21 |
| 2007/0025651 A1 * | 2/2007 | Kakei | F16C 29/06 384/45 |
| 2007/0071372 A1 * | 3/2007 | Kuwabara | F16C 29/0611 384/44 |
| 2011/0110616 A1 | 5/2011 | Watson | |
| 2012/0195535 A1 * | 8/2012 | Shibuya | F16C 29/065 384/13 |
| 2014/0328553 A1 | 11/2014 | Taylor | |

FOREIGN PATENT DOCUMENTS

| | | | | |
|---|---|---|---|---|
| EP | 1669160 | 10/2008 | | |
| WO | 2010051644 | 5/2010 | | |
| WO | WO-2011025430 A1 * | 3/2011 | ............. | F16C 19/52 |

OTHER PUBLICATIONS

European Patent Office, Examination Report on EP Appln. No. 16161884.8, dated Sep. 8, 2017.

* cited by examiner

LINEAR MOTOR CONVEYOR SYSTEM, BEARING SYSTEM AND SYSTEM AND METHOD OF LUBRICATION THEREFOR

RELATED APPLICATIONS

This patent disclosure claims priority to U.S. Provisional Patent No. 62/136,800 filed Mar. 23, 2015, the content of which is hereby incorporated herein by reference.

FIELD

The present disclosure relates generally to linear motor conveyor systems, bearing systems for moving elements on a linear motor conveyor and, more particularly, bearing systems and lubrication systems and methods used in linear motor conveyors.

BACKGROUND

In conventional linear motor conveyors or systems, a moving element is controlled to move along a track by electromotive force. In a moving magnet linear motor, the moving element typically includes a magnet that supports or attracts the moving element to the track. In order to allow movement, the moving element generally has one or more bearings which run along the track and are supported by guide rails or the like on the track. The bearings are provided to the moving element such that the moving element can move along the track/guide rail while a bearing surface of the bearing is in contact with the guide rail. Depending on the application, the bearings may include, for example, wheels, rollers, plain bearings, ball bearings, needle bearings, roller bearings and the like.

Conventional bearing systems may have various problems or issues. For example, conventional bearings may have specific parallelism tolerances i.e. the bearings need to be aligned as close to parallel as possible. If conventional bearings do not meet these tolerances, the bearings or moving element may be prone to binding during movement. In particular, conventional bearings may have difficulty in achieving high precision, accurate, and repeatable movement along the direction of motion. Factors that may cause variability in precision include i) component manufacturing tolerances, ii) backlash or play (backlash or play is the clearance caused by gaps between components or parts), iii) how well the bearings are seated on the guide rail datum surfaces, and iv) the accuracy of a moving element position measuring system.

Conventional bearings are also not typically able to move well on curvilinear profiles (i.e. curved tracks). While some bearing configurations exist that can move along curved profiles, they are generally costly, difficult to manufacture, and have flexibility or tolerance constraints with regard to the curvilinear profiles.

In order to attempt to overcome some of the issues with precision as well as tolerance and strength against wear (particularly in load-bearing applications), bearing systems will often use metal (for example, steel) wheels rolling on metal (for example, steel) rails. However, the use of higher performance materials, such as hardened steel in load bearing or high speed applications can result in higher costs and complexity. Further, steel wheels riding on steel rails can be quite loud, especially when crossing rail joints or transitions.

Therefore, there is a need for improved linear motor conveyor systems, bearing systems, or bearings, and lubricating systems and methods which may address at least some of the issues with conventional systems.

SUMMARY

According to one aspect herein, there is provided a conveyor bearing system including a guide rail, one or more bearings provided to a moving element, wherein a bearing surface of the bearings are formed of polymer and a lubricating film is applied to one or both of the guide rail and the bearing surface to reduce friction between the guide rail and the bearings.

In one particular case, the lubricating film may be applied by an adsorbent material provided to the moving element. The absorbent material may be a felt and may be shaped to match with or conform to a shape of the guide rail. The felt may also be mounted to the moving element such that it is biased to generally remain in contact with the guide rail, for example by spring-loading or the like.

According to another aspect herein, there is provided a linear motor conveyor system including: a linear motor track comprising a first guide rail and a second guide rail, wherein the first guide rail has a shaped profile and the second guide rail has a flat profile; at least one moving element provided to the linear motor track comprising a first bearing having a shaped profile with a first bearing surface of polymer configured to engage the first guide rail and a second bearing having a flat profile with a second bearing surface configured to engage the second guide rail; and a lubrication system provided to one of the track and the at least one moving element and configured to provide a lubricant between the first guide rail and the first bearing surface.

In one case, the first bearing may include two first bearings, wherein each of the two first bearings has a bearing surface of polymer and the first guide rail may be metal. In this case, the second bearing may include two second bearings and each of the two second bearings may have a bearing surface of polymer and the second guide rail may be metal. Also in this case, the lubrication system may be located between the two first bearings along a direction of the first guide rail.

In another case, the lubrication system may include: a lubricant applicator provided to the at least one moving element, wherein the lubricant applicator is an absorbent material and configured to absorb a lubricant such that the lubricant is deposited on the first guide rail by contact with the first guide rail; and a biasing element to bias the lubricant applicator towards the first guide rail to maintain contact with the first guide rail.

In yet another case, the at least one moving element may include a plurality of moving elements and the lubrication system may be provided to predetermined moving elements of the plurality of moving elements.

In any of the above cases, the moving element may be held to the linear motor track by magnetic forces.

According to another aspect herein, there is provided a linear motor conveyor system including: a linear motor track comprising at least one guide rail; at least one moving element comprising at least one bearing configured to engage the at least one guide rail; and a lubrication system provided to one of the track and the at least one moving element and configured to provide a lubricant for interaction between the at least one guide rail and the at least one bearing, wherein at least one of the at least one guide rail and the at least one bearing are polymer at a point of contact between the at least one guide rail and the at least one bearing.

In one case, the guide rail may be a shaped guide rail and the bearing may be a shaped bearing that corresponds with the shape of the shaped guide rail.

In another case, the lubrication system may include: a lubricant applicator provided to the at least one moving element, wherein the lubricant applicator is an absorbent material and configured to absorb a lubricant such that the lubricant is deposited on the guide rail by contact with the guide rail; and a biasing element to bias the lubricant applicator towards the at least one guide rail to maintain contact with the at least one guide rail. In this case, the lubrication system may further include: a lubrication port on the at least one moving element for receiving the lubricant for the lubricant applicator.

In yet another case, the at least one guide rail may be polymer.

In still yet another case, the at least one bearing may include at least two bearings and the lubrication system may be located between the two bearings generally along a direction of the at least one guide rail.

In a further case, the at least one moving element may include a plurality of moving elements and the lubrication system may be provided to predetermined moving elements of the plurality of moving elements.

In yet a further case, the lubrication system may be provided to the track and configured such that a lubricant from the lubrication system may be provided to the at least one guide rail and the at least one bearing by movement of the moving element.

In still yet a further case, the at least one guide rail and the at least one bearing engage such that the at least one bearing is held against the at least one guide rail primarily by magnetic forces between the moving element and the track.

In yet another case, the at least one guide rail may include a first guide rail and a second guide rail, wherein the first guide rail is shaped and the second guide rail is flat and the guide rails are parallel and at a predetermined distance from one another; and the at least one bearing comprises a first set of bearings and a second bearing, wherein the first set of bearings comprises two bearings that are in spaced arrangement on the moving element along the direction of the first guide rail and are positioned and shaped to engage with the first guide rail and the second bearing is flat and positioned to engage with the second guide rail. In this case, the second guide rail and second bearing may alternatively also be a shaped. Also, the second bearing may include two bearings in spaced arrangement on the moving element along the direction of the second guide rail. Additional guide rails and bearings, shaped or flat, may also be provided.

According to another aspect herein, there is provided a method of lubricating a linear motor conveyor system, the method including: adding lubricant to a lubrication system provided to a moving element of a linear motor conveyor system, wherein the moving element comprises at least one bearing having a polymer bearing surface and the lubrication system comprises a lubricant applicator configured to absorb the lubricant; biasing the lubricant applicator toward a guide rail of a track of the linear motor conveyor system; and determining when the lubricant needs to be replenished and, if so, moving the moving element to a lubricant replenishment station and automatically adding lubricant.

In one case, the determining may include calculating if the operating time of the moving element exceeds a predetermined threshold.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides a conveyor system with an improved bearing system for bearing/supporting a moving element and an improved lubrication system for facilitating movement of the moving element. In particular, the bearing system may include polymer bearings or bearing surfaces, or the like, and a lubrication system to provide a lubricant film to reduce friction and extend the life of the bearing system.

Figure 1:
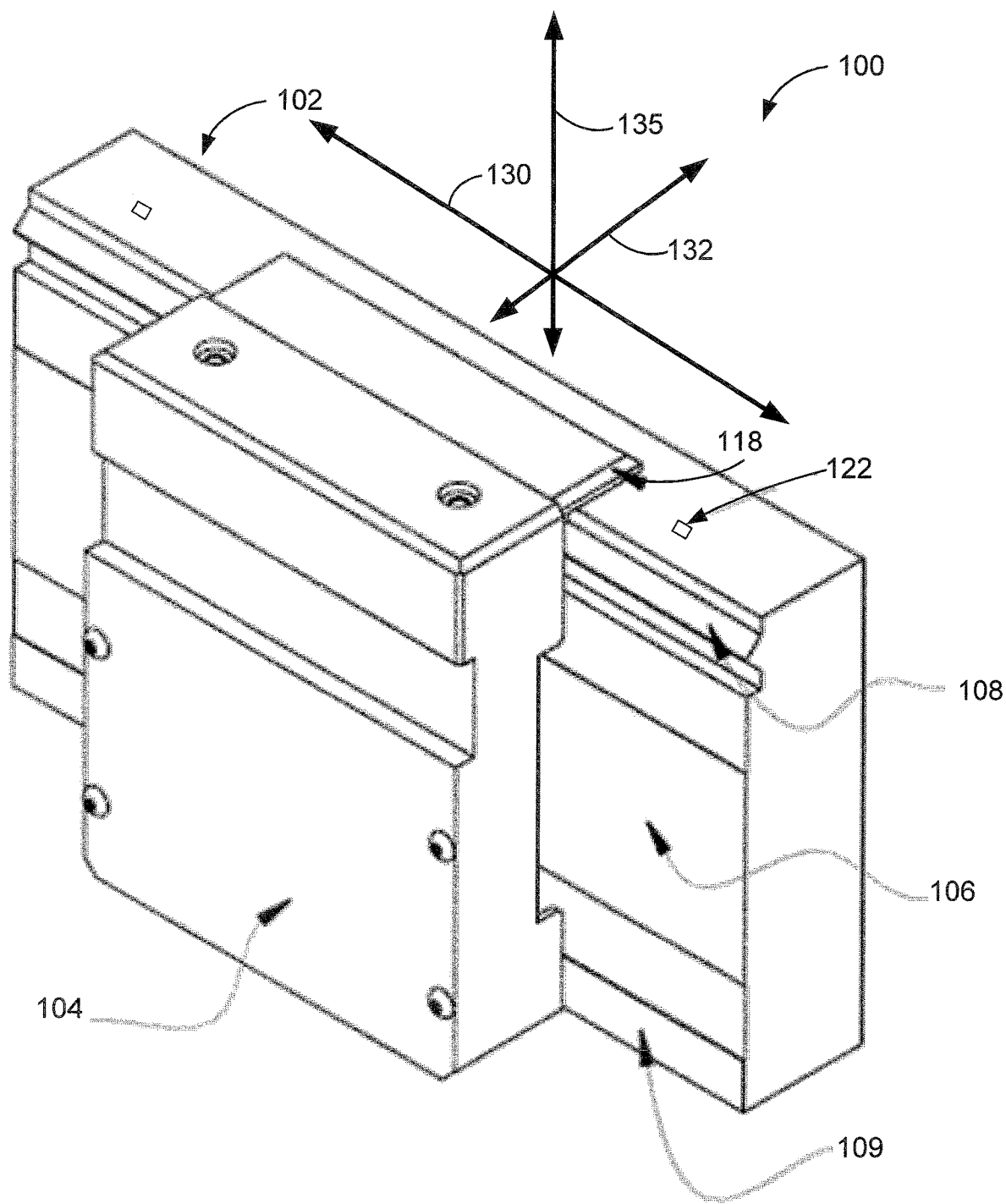
FIG. 1 is a track section of a conveyor system with a moving element, in accordance with an embodiment herein.

FIG. 1 illustrates an example of a linear motor conveyor system 100 having a track section 102. The track section 102 features one or more moving elements 104 (only one is illustrated) which are configured to ride or travel along a track 106. Some of the principles of operation of a similar track section are described in more detail in U.S. Pat. No. 8,397,896 to Kleinikkink et al., which is hereby incorporated herein by reference.

Figure 7:
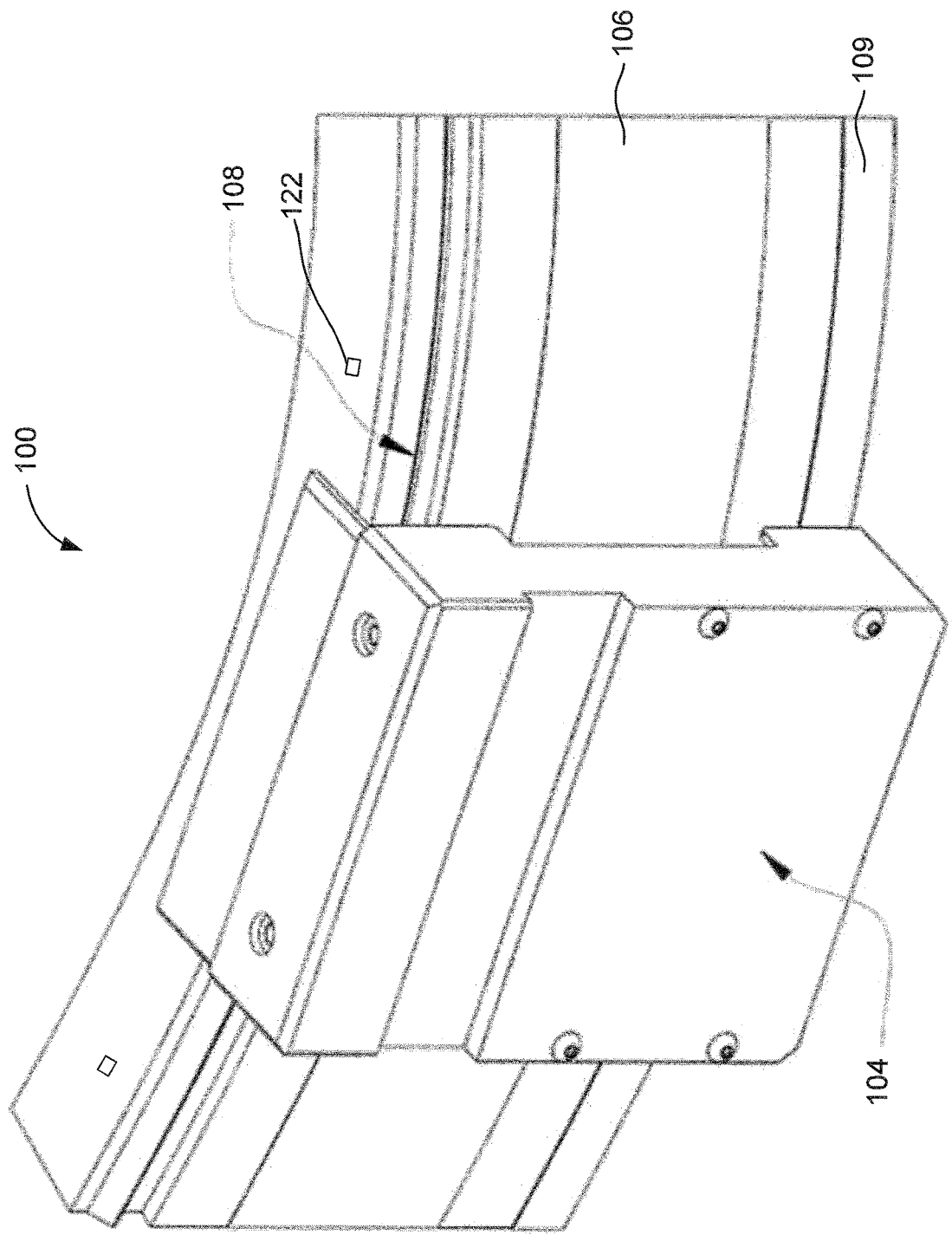
FIG. 7 is a perspective view of a conveyor system having a curved track section, in accordance with an embodiment herein.

In one example, the conveyor system 100 may include a plurality of track sections 102 which are mechanically self-contained and separable from one another so as to be modular in nature. In this embodiment, the track sections 102 are mounted on a support (not shown) so as to align and abut one another in order to form a longer track. In order to be modular, each track section 102 may house electronic circuitry for powering and controlling the track section 102. The conveyor system 100 may include curved track sections (e.g. as shown in FIG. 7).

Figure 2A:
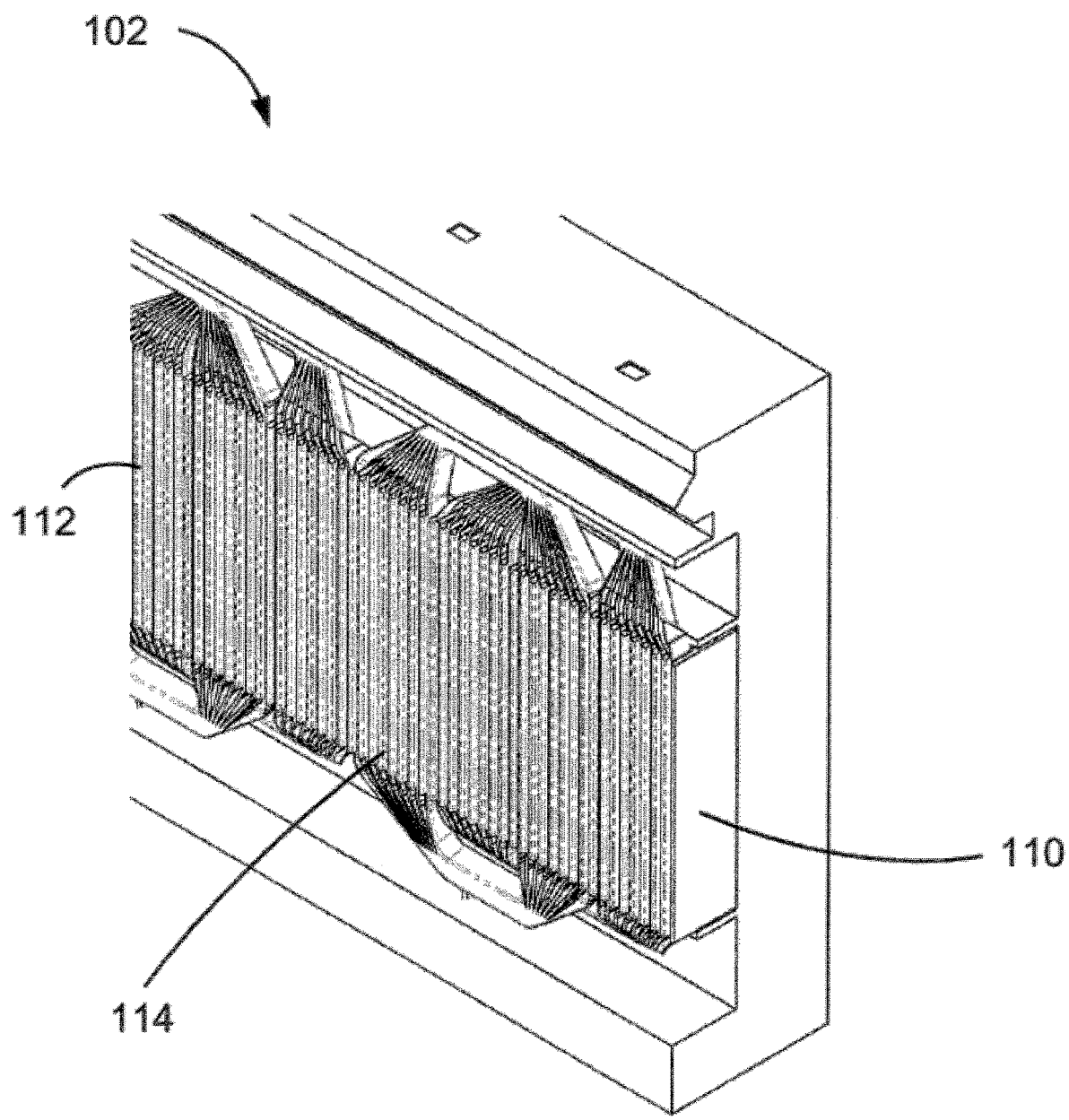
FIG. 2A is a perspective view of the track section of FIG. 1 having a cover removed to show a linear drive mechanism.
Figure 2C:
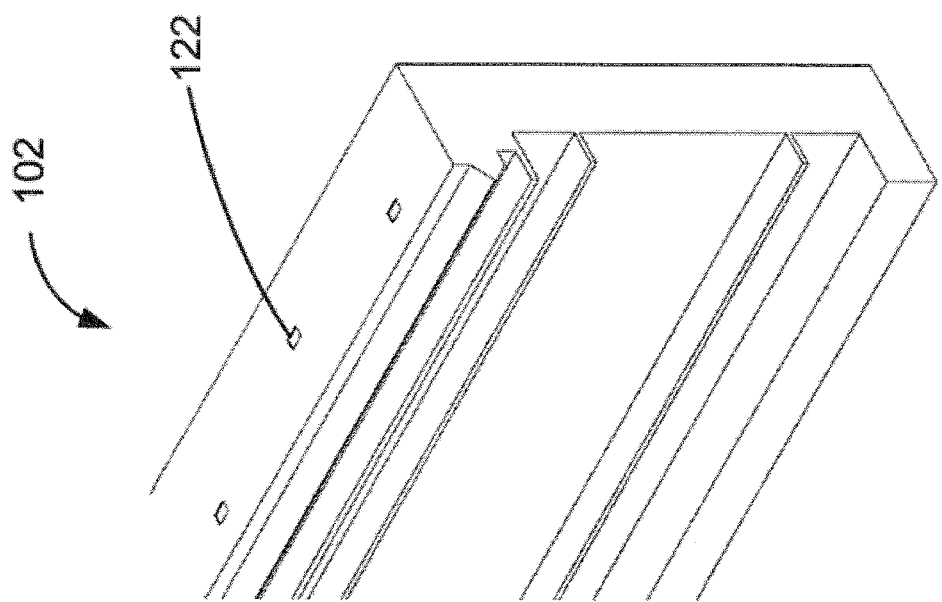
FIG. 2C is a perspective view of the track section of FIG. 1 with the linear drive mechanism removed.
Figure 2B:
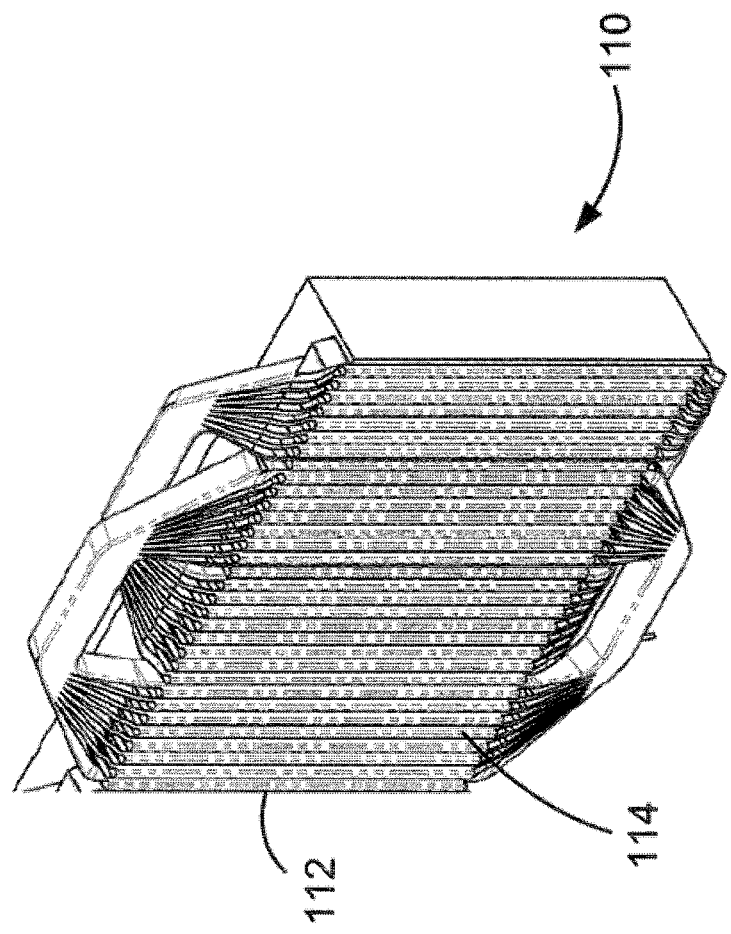
FIG. 2B is a perspective view of a linear drive mechanism of the track section of FIG. 1.

FIG. 2A illustrates a perspective view of the track section 102 with a cover plate removed to show a linear drive mechanism 110. FIG. 2B shows the linear drive mechanism 110 and FIG. 2C shows the track section 102 with the linear drive mechanism 110 removed. In this example, the linear drive mechanism 110 is formed as a stator armature 112 including a plurality of embedded coils 114 which may be excited (e.g. individually) so that an electrically-induced magnetic flux produced by the stator armature 112 is located adjacent to a given moving element 104 to be controlled, in a direction normal thereto, without affecting adjacent moving elements 104. The motive force for translating each moving element 104 arises from the magnetomotive force (MMF) produced by the magnet of each moving element 104 and the stator armature 112, i.e., by the tendency of the corresponding magnetic fluxes provided by the stator armature 112 and the magnet of the moving element 104 to align. A controller (described below) enables separate and independent moving MMFs to be produced along the length of the track section 102 for each moving element 104 so that each moving element 104 can be individually controlled with a trajectory profile that is generally independent of any other moving element 104. Structurally, the track section 102 may thus be broadly classified as a moving-magnet type linear brushless motor having multiple moving elements 104. Other types of linear motor conveyors may also include the bearings and lubrication system and method described herein. In some embodiments, the moving elements 104 may be controlled in other ways (e.g. the moving elements may be controlled as a group along the track section 101 or the like rather than individually).

Referring again to FIG. 1, each moving element 104 includes an extension 118 provided with a machine readable medium 120 (not visible in FIG. 1). In this embodiment, the machine readable medium is a magnetic strip but may alternatively be another appropriate medium such as an optically transmissive or reflective strip, or another type of feedback system or the like. The extension 118 is configured such that the machine readable medium 120 interacts with sensors 122 provided to the track 106. The sensors 122 are configured to read the machine readable medium 120, whether magnetically, optically, or otherwise as appropriate. The machine readable medium 120 and sensors 122 form a position sensing system. The position sensing system may be arranged such that the position sensing system is protected from traffic on the track section 102 and dust and other debris. For example, the machine readable medium 120 may be located on the bottom side of the extension 118.

In one embodiment, the sensors 122 are located on the track section 102 and the machine readable medium 120 is located on the moving element 102. In an alternative, the sensors 122 may be located on the moving element 104 and the machine readable medium 120 may be located on the track section 102. The sensors 122 are configured to read a position of the moving element 104 on the track section 102 from the machine readable medium 120. In some embodiments, the position of moving elements 104 may be detected in other ways (e.g. using RF-sensors, wireless triangulation or the like).

Figure 3:
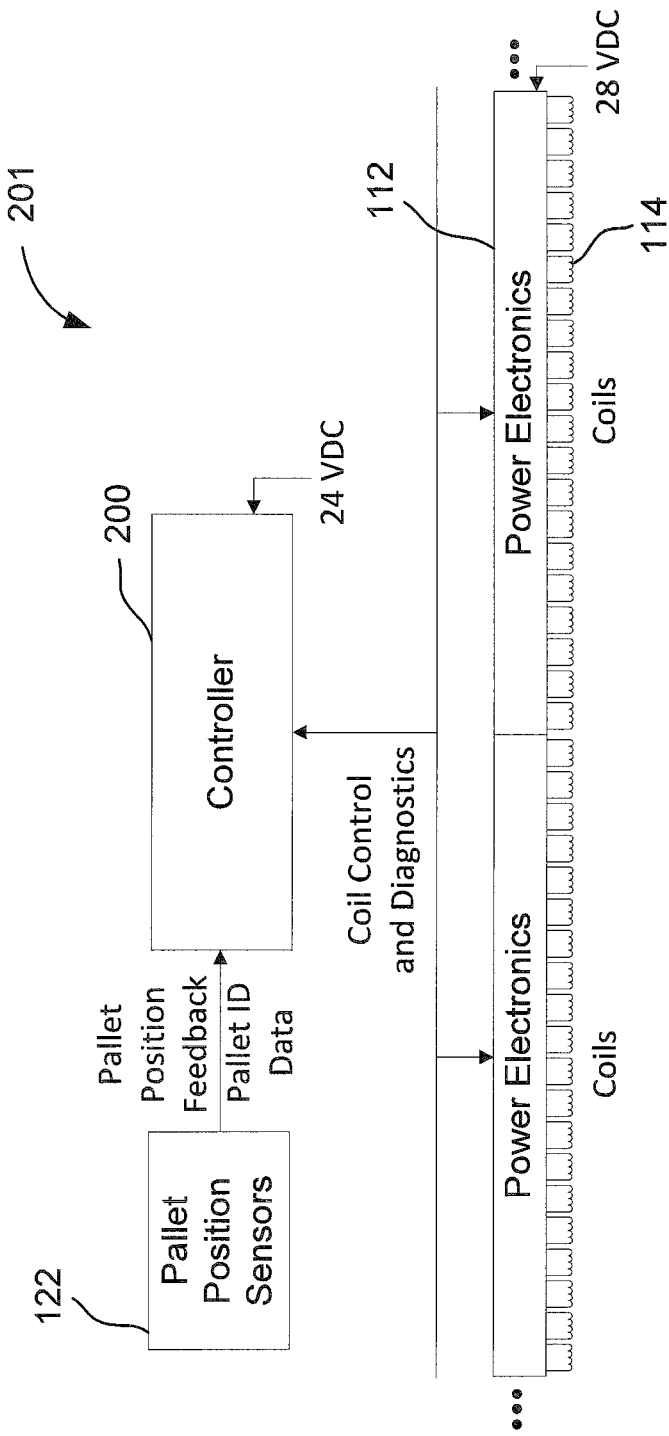
FIG. 3 is a block diagram of an example control architecture employed in the conveyor system.

FIG. 3 is a block diagram of an example control architecture 201 employed in the conveyor system 100. Controller 200 controls the overall conveyor system 100 and the track 102 used in the conveyor system 100. The controller 200 is configured to monitor moving element position and control the movement of moving elements 104 to go to desired destinations based on the moving element position. As such, the controller 200 can be used for process (for example, manufacturing-line) control. The controller 200 may also provide a supervisory diagnostic role by monitoring the track sections 102 (for example, by engaging in a continuous polling or pushing process) in order to determine the current status of any track section 102 and whether any track section 102 has failed. It will be understood that, in some cases, the controller 200 may directly control each of the track sections 102.

The controller 200 may also be connected to other devices, such as programmable logic controllers (PLCs) (not shown) via input/output (I/O) or network modules. The PLCs may provide manufacturing-line station-processing instructions to the track section 102, such as directing the next destination for a moving element 104 along the track 102, or providing station-specific motion instructions in respect of a given moving element 104.

As illustrated, the controller 200 is connected to the stator armature 112 and coils 114 in the track sections 102 and controls the coils 114 in accordance with an independent trajectory or "move" command for each moving element 104 located therein.

The controller 200 is also connected to the sensors 122 situated in the track section 102. The controller 200 is used to implement a closed-loop digital servo control system that controls movement of each of the moving elements 104 by resolving the real-time position of each moving element 104 located in the track section 102. When the machine readable medium 120 of a given moving element 104 moves over a given sensor 122, moving element position feedback is transmitted to the controller 200. The controller 200 decodes the moving element position feedback to determine the position of each of the moving elements 104. The controller 200 includes machine control software that allows it to co-ordinate the control of the linear motor conveyor. In some embodiments, the machine control software may be distributed over a number of controllers.

Referring again to FIG. 1, the conveyor system 100 includes the track 106 that produces a magnetic force for moving the moving element 104 along the track 106. The magnetic force also captures, supports or holds the moving element 104 on the track 106. The magnetic force is partly generated by the interaction of the magnetic flux created by the embedded coils 114 of the track 106 and magnetic elements 128 of the moving element 104. The magnetic force can be thought of as having a motive force component for directing movement of the moving element 104 along an X axis 130 (direction of travel) on the track 106, a capturing force component to hold, on a Y axis 132 (laterally), the moving element 104 on the track 106. In practice, the motive force and the capturing force is generally provided by the same magnetic flux elements 128.

The track 106 includes a first guide rail 108 and a second guide rail 109 configured to support the moving element 104. The first and second guide rails 108, 109 are configured such that the moving element 104 may be removed from the track 106 when the magnetic force is overcome. The magnetic force is overcome, for example, where a user pries the moving element 104 away from the track 106. In an alternative, the moving element 104 may be removed from the track 106 where the magnetic force is reversed, reduced, or removed. In particular, in some embodiments, the guide rails 108, 109 have an open shape so that the bearings interacting with the guide rails 108, 109 engage with the guide rails 108, 109 in a way such that the bearings are not locked or held onto the guide rails 108, 109 other than by a magnetic force between moving element and the track.

In this embodiment, the first guide rail 108 supports the moving element 104 vertically and horizontally. The first guide rail 108 may have a shaped profile to support and guide the moving element 104 on the track 106, for example, a "V" shape or a "U" shape or the like. In the figures, the first guide rail 108 is shown with a "V" shape. In this embodiment, the second guide rail 109 is flat and supports the moving element 104 horizontally. The second guide rail 109 may alternatively also have a shaped, such as a "V" or "U" shape or the like.

Figure 4:
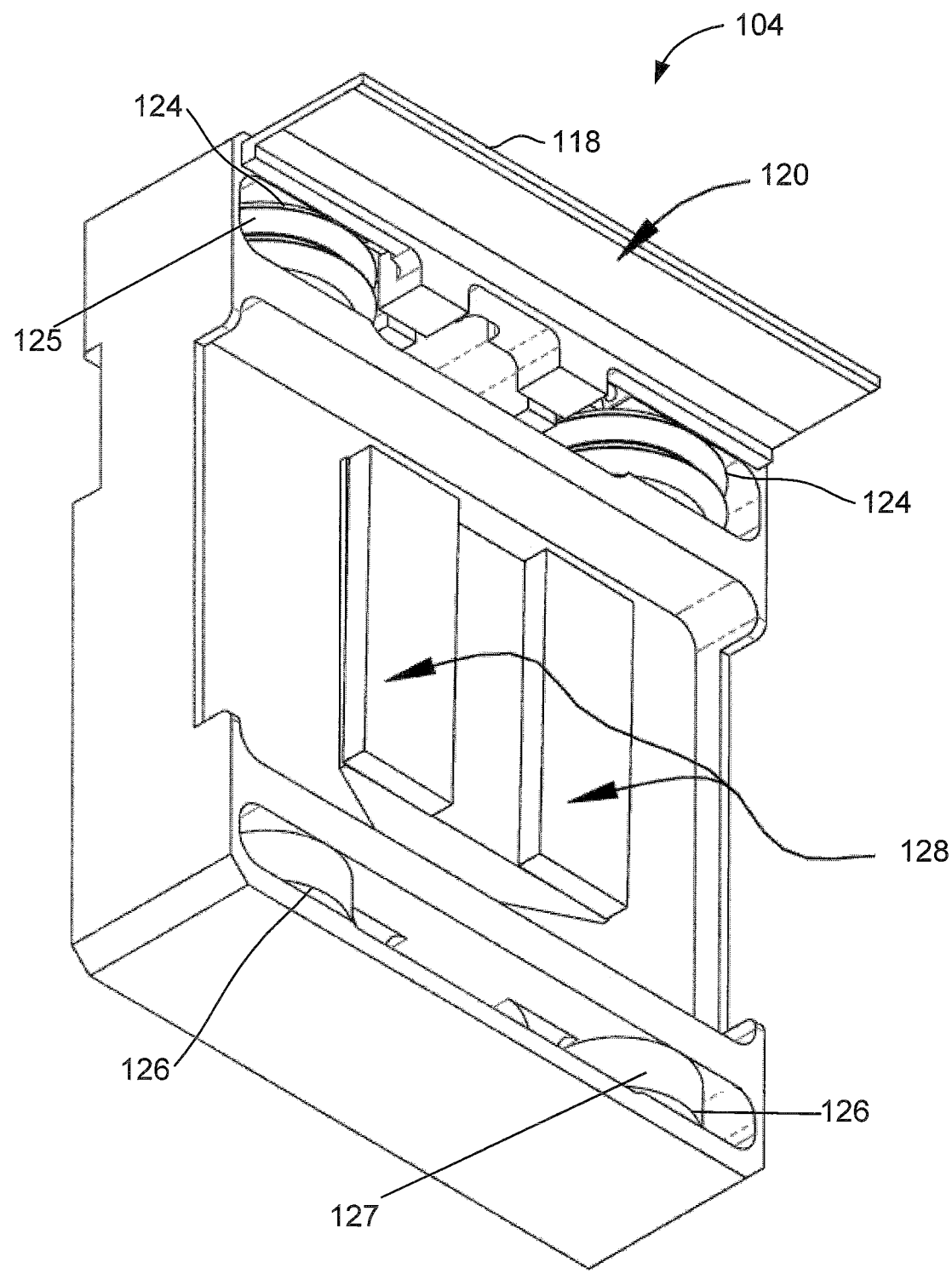
FIG. 4 is a perspective view of a moving element of the conveyor system of FIG. 1, in accordance with an embodiment herein.

FIG. 4 shows an example of a moving element 104 illustrating magnetic elements 128. The magnetic elements 128 provide a magnetic flux that corresponds to or interacts with the magnetic flux created by the coils 114 of the track 106. In some embodiments, the magnetic elements 128 may be permanent magnets.

The moving element 104 has a first set of bearings 124 and a second set of bearings 126. In this embodiment, the first set of bearings 124 is located above the second set of bearings 126. The first and second set of bearings 124, 126 may be wheel bearings that are rotatably attached to the moving element 104.

The first set of bearings 124 provide a bearing surface 125 that rides on the first guide rail 108. The first set of bearings 124 has an edge profile of the bearing surface 125 that corresponds to the profile of the first guide rail 108. In an embodiment, the first set of bearings 124 has a "V" shaped profile that matches the opposite "V" shape profile of the first guide rail 108. The first set of bearings 124 may alternatively have a "U" shaped profile or another appropriately shaped profile intended to support the moving element 104 along both a Y axis 132 (e.g. horizontally) and a Z axis 135 (e.g., vertically, shown in FIG. 1). In certain cases, the moving element 104 has two bearings in the first set of bearings 124, separated around a center vertical axis of the moving element.

The second set of bearings 126 provide a bearing surface 127 that rides on the second guide rail 109. The second set of bearings 126 has an edge profile that corresponds to the profile of the second guide rail 109. In an embodiment, the second set of bearings 126 has a flat profile (e.g., a flat wheel) that matches the flat profile of the second guide rail 109. The second set of bearings 126 may roll a bit higher or lower on the second guide rail 109 to adapt to any non-parallelism of or with the first guide rail 108. In some cases, the second set of bearings 126 includes a plurality of bearings.

Higher precision may be achieved over conventional conveyors by supporting the moving element 104 with magnetic force and the first set of bearings 124 to control the moving elements 104 along the Y axis 132 and the Z axis 135 including position and rotation. In certain cases, the first set of bearings 124 maintains the moving element 104 along the Y axis 132 and the Z axis 135 and maintains pitch rotation (about the Y axis 132) and yaw rotation (about the Z axis 135). The first set of bearings 124 provides movement and positioning along the X axis 130.

The second set of bearings 126 constrain rotation of the moving element 104 about the X axis 130. The second set of bearings 126 may be positioned at a distance from the first guide rail 108 to minimize variability due to rotation about the X axis 130 on the working surface 138. The bearings 126 and the second guide rail 109 may have tight tolerances on the dimensions that impact rotation about X axis 130 to allow precise positioning of the moving element 104 in rotation about the X axis 130.

In the embodiment shown in FIG. 4, the moving element 104 has two "V" shaped bearings 124 and two flat bearings 126. The two flat bearings 126 and the two V-shaped bearings 124 (four bearings in total) may provide increased stability in rotation about the Z axis 135 and/or the X axis 130. This may allow payloads mounted to the moving element 104 that have higher cantilever than, for example, a three bearing configuration (see FIG. 5). With four bearings 124, 126, the center of gravity of an added payload that is mounted to the moving element 104 may be shifted farther away from the track 106.

Figure 5:
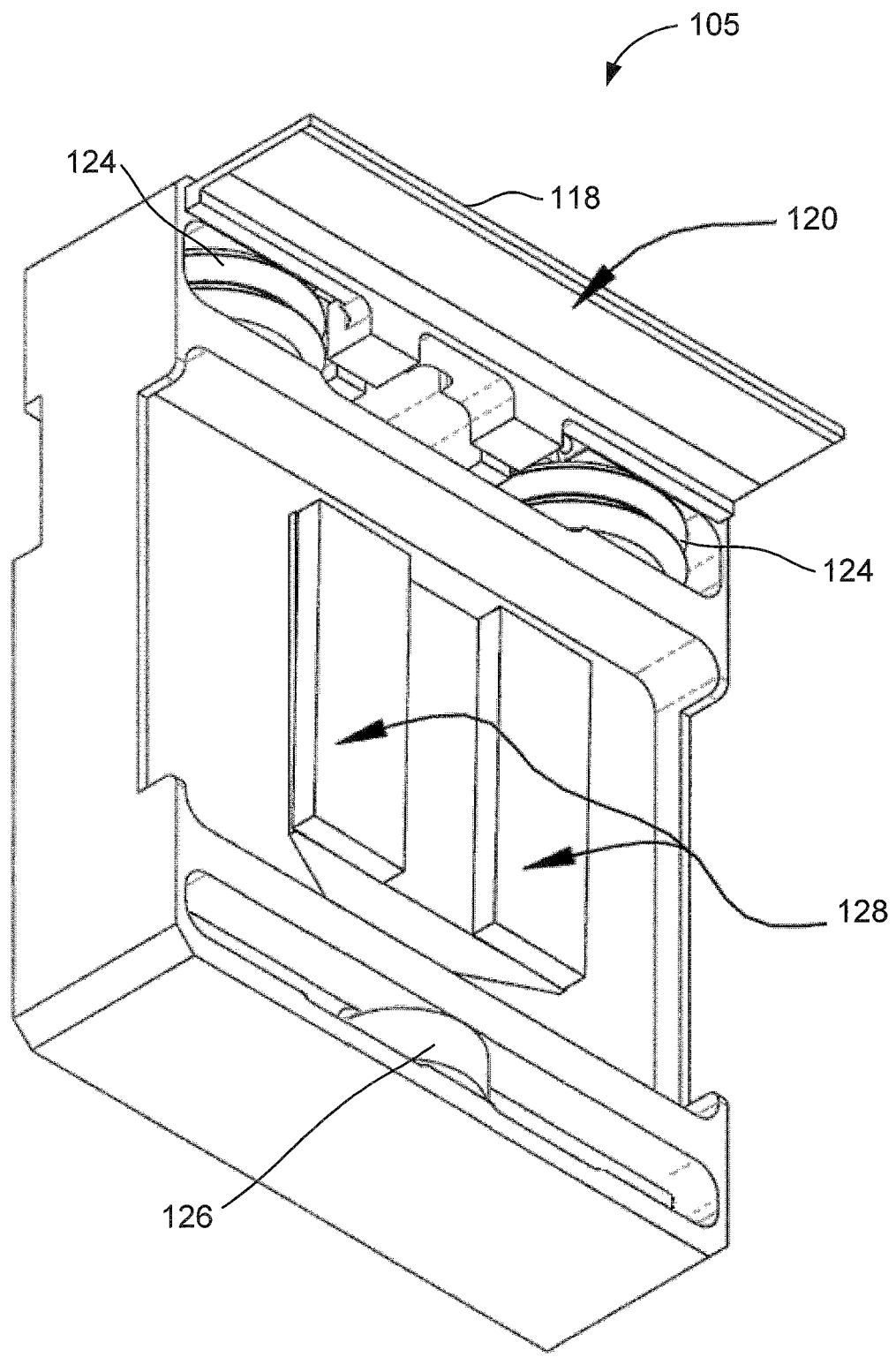
FIG. 5 is a perspective view of a moving element of the conveyor system of FIG. 1, in accordance with another embodiment herein.

FIG. 5 shows an alternate moving element 105 that has two "V" shaped bearings 124 and one flat bearing 126. The one flat bearing 126 may provide for a single contact point with the second guide rail 109. The one flat bearing 126 and two shaped bearings 124 (three bearings in total) may provide three point contact to ensure a consistent force of the bearings 124, 126 on the guide rails 108, 109. The magnetic force of the permanent magnets 128 along the Y axis 132 is shared across all three bearings 124, 126 consistently both while the moving element 105 is in motion and when stopped.

Figure 6:
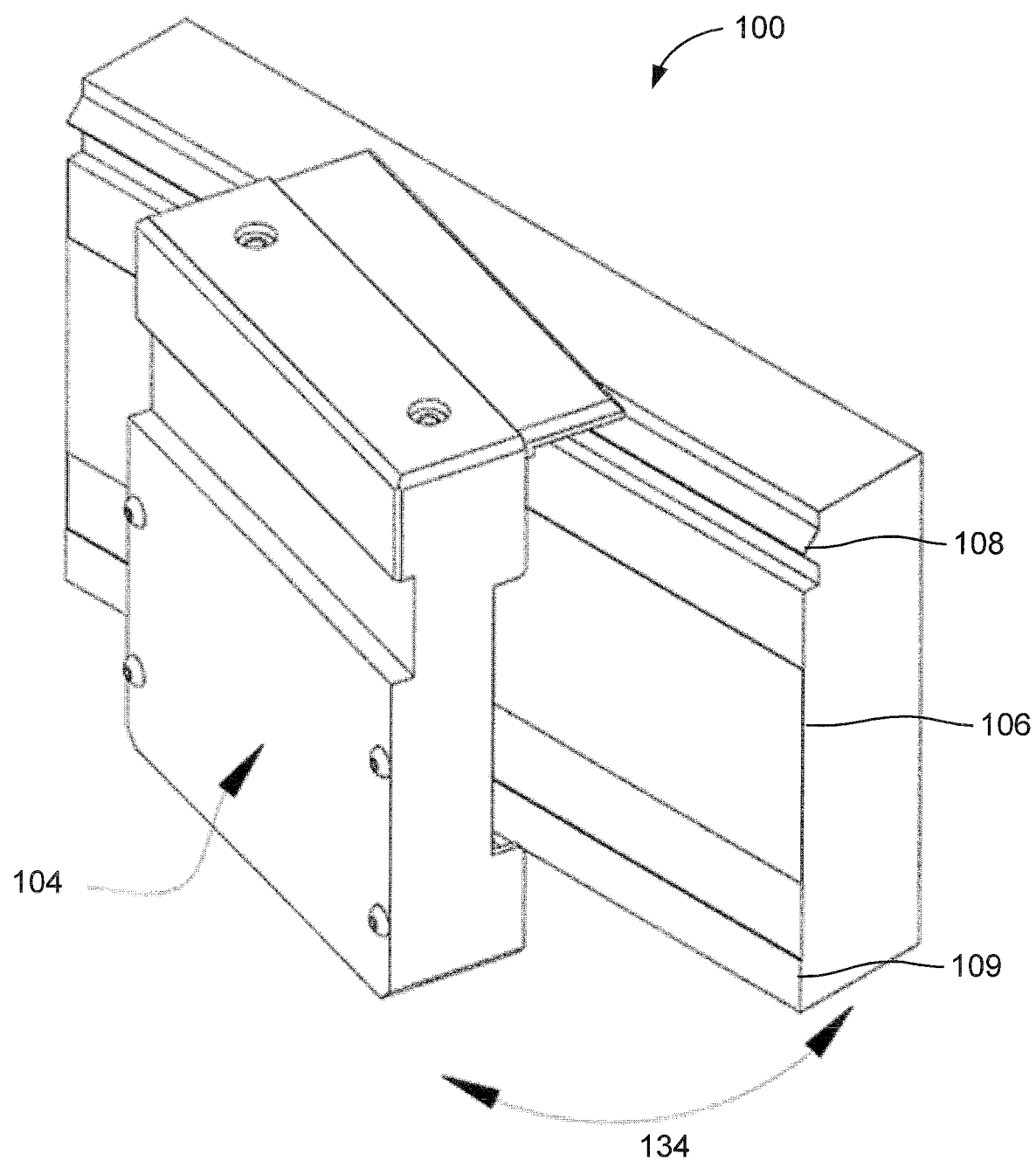
FIG. 6 is a perspective view of the conveyor system of FIG. 1 with the moving element being removed.

FIG. 6 illustrates the moving element 104 being removed from the track 106, in accordance with an embodiment. The first and second set of bearings 124, 126 are removable from the track 106 as the bearings 124, 126 are not locked into the guide rails 108, 109. When the magnetic force generated between the magnets 128 and the stator armature 112 is overcome, the moving element 104 may be removed from the track 106. For example, in the present embodiment, wherein the moving element uses permanent magnets, the moving element 104 may be pried off (e.g., in a direction 134) of the track 106 without any disassembly of bearings or guide rails or removal of the magnetic force. The moving element 104 may be removed from the track 106 by hand or by using a pry tool.

FIG. 7 illustrates an embodiment of a conveyor system 100 having a curvilinear profile. In this example, the first set of bearings 124 and the second set of bearings 126 roll over first and second guide rails 108, 109. In this way, the conveyor system 100 may not need tight tolerances with rail parallelism and reduce binding of the moving element 104 and the track 106. It is intended that binding may be avoided due to the second set of bearings 126 having room on the guide rail 109 such that they are free to roll slightly higher or lower on the guide rail 109. Where the track section 102 is curvilinear, the sensors 122 are positioned along the curvilinear profile such that the machine readable medium 120 can be read by the sensors 122 and the readings are then translated from the curvilinear profile to a linear profile, using linear units such as microns, for the purposes of feedback control. Control of the moving element 104 then occurs in the linear profile/linear units.

The conveyor system 100 may not require added preload hardware or preload adjustments to keep the first set of bearings 124 in contact with the first guide rail 108 or the second set of bearings 126 in contact with the guide rail 109 because a preload is achieved by the magnetic force generated between the magnetic elements 128 and the stator armature 114.

In embodiments of the linear motor conveyor system 100 described herein, unlike conventional linear motor conveyors, the bearings (in this case, wheels) 124, 126, or bearing surfaces 125, 127, or the guide rails 108, 109 may be made of polymer materials. In some embodiments, the bearings 124, 126, bearing surfaces 125, 127, or the guide rails 108, 109 may be polymers such as nylon (e.g. Nylatron™), acetal resin (e.g. Delrin™), or polyethylene terephthalate (e.g. Ertalyte™). In some cases, some types of acetal resin (e.g. Delrin™) may be particularly advantageous. In some cases, the polymer material may be a coating provided to a bearing or guide rail of another material while in others the polymer material may form the bulk or all of the bearing or the guide rail.

In any bearing system, there can be issues with wear on the bearings/wheels or the guide rails due to friction, loads and the like. For example, in systems involving V shaped wheels, the two riding surfaces have an inherent friction as the V wheel rolls along a V shaped rail and can cause wear. Bearing systems that use V-wheels typically deal with this problem by making use of metal materials having higher hardness, smoother finishes and adding lubrication to manage the wear. For example, in some higher performance applications, both the rails and wheels are often a high grade steel, the rails are often surface or thru hardened and coatings are often used to reduce friction. However, steel wheels are generally relatively expensive and steel wheels riding on steel rails are often loud, especially crossing rail joints or transitions. Because of these various limitations, shaped (for example, "V") wheels and guide rails are generally avoided in industrial applications and those involving high stress and loads such as linear motor conveyors.

On the other hand, polymer bearings/wheels or guide rails are generally used only in light duty applications with low forces. When forces are too high, polymer wheels generally cannot stand up to the forces and inherent wear that occurs with, for example, a shaped wheel riding on a shaped rail. In a linear motor conveyor, the forces involved (such as the speed of movement) can result in very high forces and a shaped polymer wheel or guide rail will generally tend to break down and wear faster than metal wheels, resulting in higher maintenance costs and downtime for conventional conveyor systems.

Even though polymer wheels would conventionally not be considered for a linear motor conveyor application because of the loads, speeds, forces and wear involved, the applicant herein considered polymer as a material for the V-wheel bearing and/or V-shaped guide rail in the present embodiments because of factors such as: polymer wheels are less weight than metal/steel wheels; polymer wheels are quieter than metal/steel, especially at joints and transitions and can sometimes even reduce vibrations; and polymer wheels are lower cost than steel wheels. Initially, the performance of the polymer wheels suffered from issues of wear as expected based on the issues above. The same proved true for various types of polymers.

In conventional applications for polymer wheel bearings (i.e. low stress/force, low speed, low acceleration and the like), the polymer may generally have an inherently low co-efficient of friction or may include some form of lubrication such that they may be considered "self-lubricating" in the sense that the polymer has some level of reduced friction compared to a metal or the like. As such, lubricants are not generally used with polymer bearings. However, the applicants investigated adding lubricant to reduce wear on polymer wheels in embodiments such as those described herein. In particular, the applicant developed a lubricating system to maintain a lubricating film on the rail. It was discovered that, when a polymer wheel rides on a rail that has a lubricating film, the polymer wheel exhibits minimal to no wear even in a high stress/force application. This development was unexpected but produced significant results in terms of improved performance over longer periods and also provided for lower cost. As such, the applicant has been able to successfully use polymer wheel bearings in embodiments of the linear motor conveyor system described herein. In particular, in an embodiment, the polymer wheel bearings included a polymer wheel with ball bearings press fitted into a central hub. It was further determined that, when using polymer wheel bearings, the guide rail did not need to be hardened steel and a less expensive metal or a polymer could be used.

Figure 8:
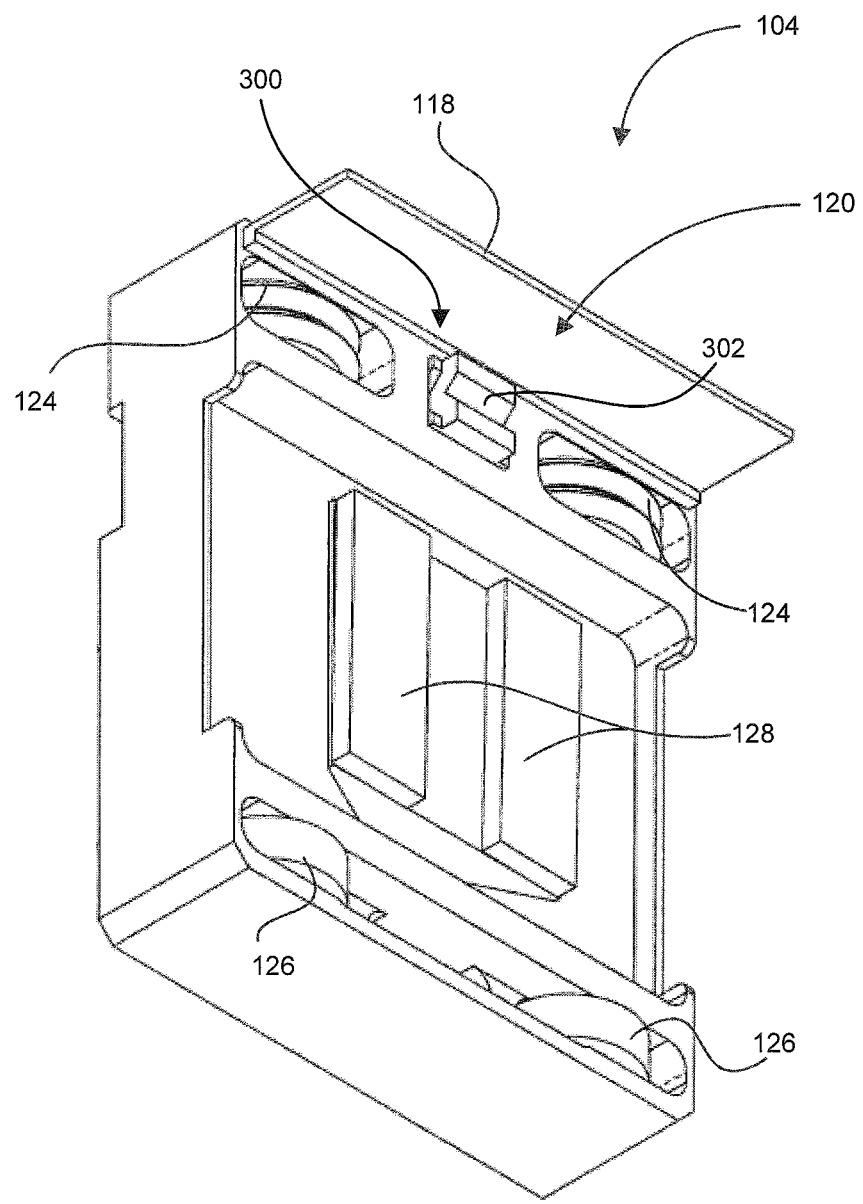
FIG. 8 is a perspective view of a moving element of the conveyor system of FIG. 1 having a lubrication system in accordance with an embodiment herein.

FIG. 8 illustrates an embodiment of a moving element 104 provided with a lubrication system 300 positioned to make contact with the guide rail on the track and provide a lubricating film to the guide rail. In this particular embodiment, the lubrication system 300 includes a lubricant applicator 302, in this case, an absorbent material, such as felt or the like, provided between the bearings 124, which may be, for example, V-shaped wheels, on the moving element 104 to make contact with the V-shaped guide rail on the track 106. Lubricant is provided to the lubricant applicator 302 to provide the lubricating film to the guide rail. Generally speaking, the lubricant is a mineral oil or synthetic oil and may be selected depending on the use of the linear motor conveyor, for example, food grade oil can be used for a conveyor operating in a food processing application. Viscosity in the range of SAE 10 to SAE 30 may be appropriate depending on factors such as the speed, loads, acceleration and the like of the use of the linear motor conveyor. In some linear motor conveyor applications, oil having a viscosity of ISO grade 46 or SAE grade 20 may be appropriate. In some applications, the oil may generally have a viscosity that is lower than SAE grade 40.

The applicant also found that the use of an appropriate absorbent material as the lubricant applicator 302 provides an appropriate lubricant film to the guide rail 108 because the absorbent material tends to apply or add lubricant only where needed and also absorb any excess lubricant if any is present on the guide rail 108. One of skill in the art will understand that the lubrication system may be provided at another location on the moving element, such as, for example, at a side thereof, could be provided on only a predetermined subset of the moving elements (called "lubrication moving elements"), or could be stationary on the track and interact with the moving elements as they pass. Many different variations are possible as long as the lubrication system is able to provide lubricant to the guide rail and/or to the bearing wheels.

In various embodiments, the lubrication may be provided to both shaped rails/shaped bearings and flat rails/flat bearings. The lubrication system used to provide the lubrication could be similar for each type of bearing or could be different. As noted above, there are various types of lubrication systems that may work depending on the nature of the guide rails and the bearings on the moving element.

Figure 9:
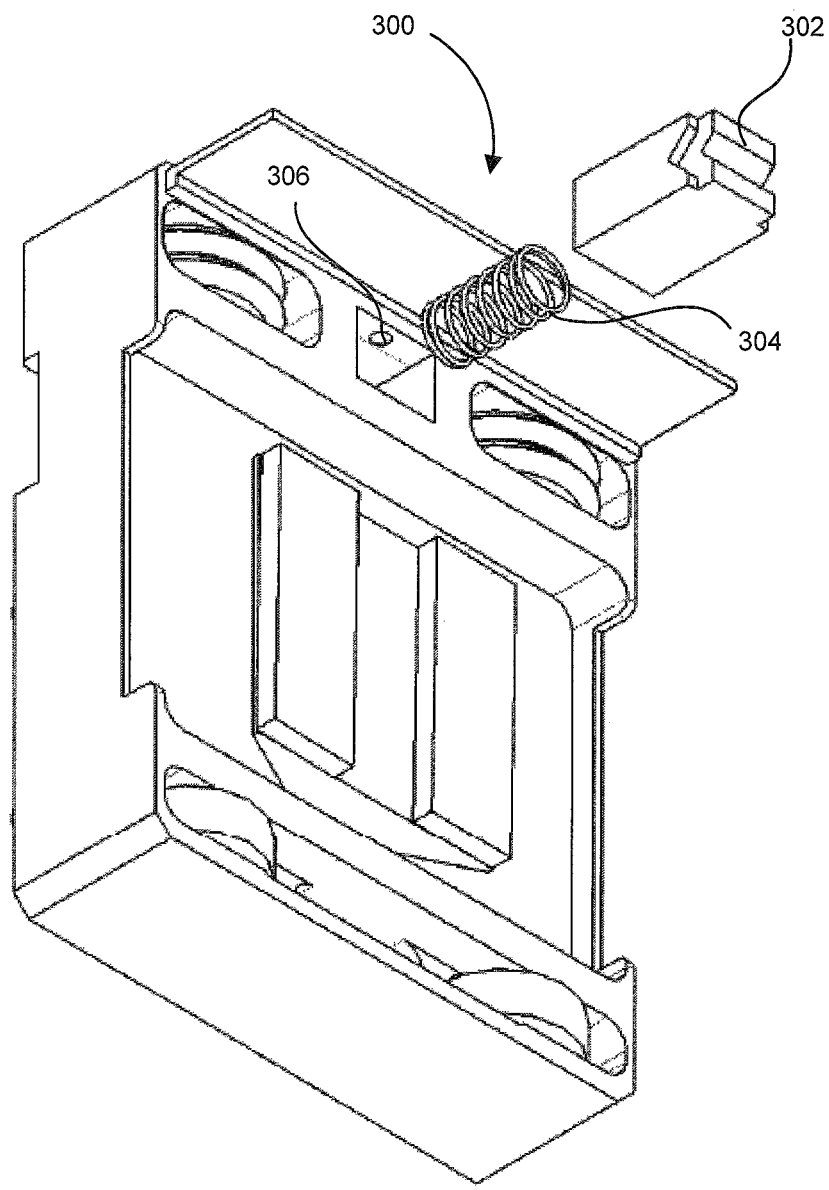
FIG. 9 is a perspective view of a moving element of FIG. 8 showing the lubrication system in an exploded view.

FIG. 9 illustrates an exploded view of the lubrication system 300 showing that the lubricant applicator 302 is biased toward the guide rail 108 of the track 106 by a biasing element 304, in this case, a coil spring. Other biasing elements 304 include a leaf spring, coil spring, bladder, compliant material or the like. Biasing the lubricant applicator 302 to the guide rail may provide contact with and compliance with the guide rail even along curvilinear surfaces or the like. The use of a biasing element 304 of appropriate force also assists with maintaining an appropriate lubricant film on the rail without too little or too much lubricant.

Figure 10:
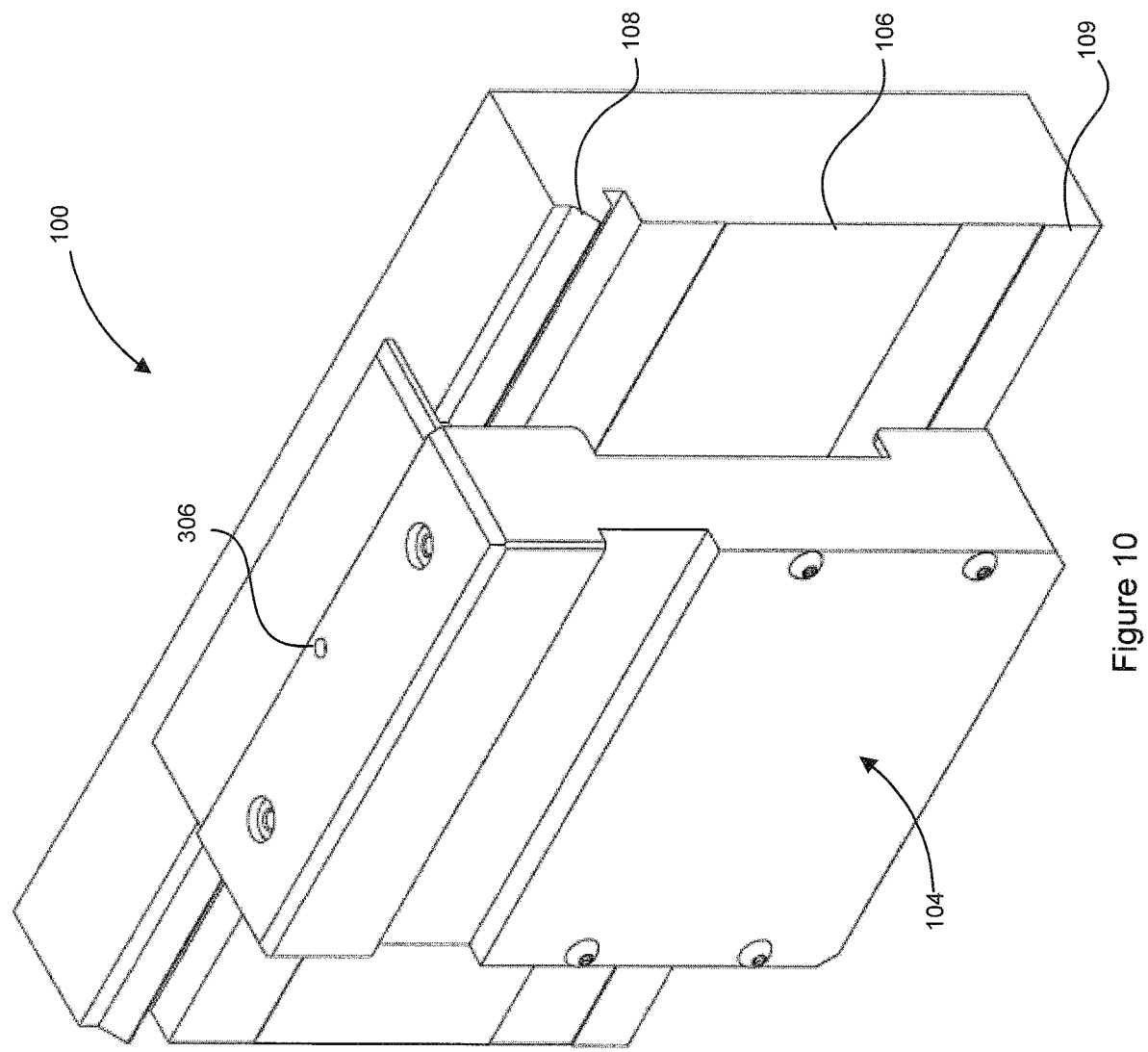
FIGS. 10 and 11 illustrate views of the moving element of FIG. 8 on straight and curved track sections, respectively.
Figure 11:
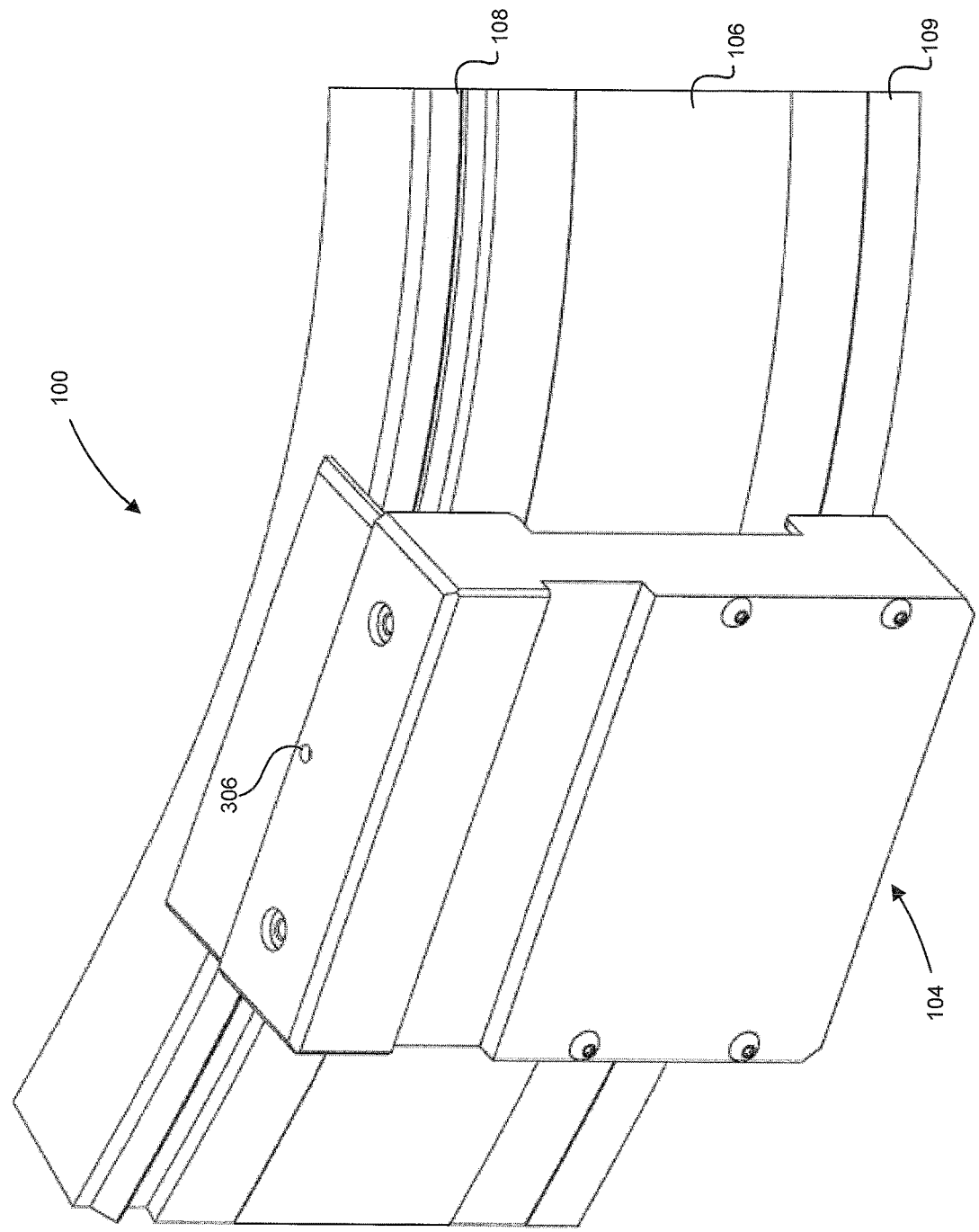

FIGS. 10 and 11 illustrate the moving element with the lubrication system on straight and curvilinear track sections, respectively.

As seen in FIGS. 9, 10 and 11, the moving element 104 may be provided with a lubrication port 306 on a top thereof for providing lubricant to the lubricant applicator 302 or to a reservoir 307 around or adjacent to the lubricant applicator 302. In this way, the moving element does not need to be removed to add additional lubricant. The lubrication port may be open or may have a closure, for example, in situations where other materials in the environment need to be kept out of the lubrication port. In some embodiments of a conveyor system 100, the lubricant can be replenished at a replenishment station along the track of the conveyor with, for example, an automated system for inserting lubricant into the lubrication port. In an automated system, machine control software could monitor runtime and after a predetermined time period, have the moving elements stop at a lubrication adding station and receive a predetermined amount of lubricant to the absorbent material or to a reservoir through the lubrication port.

In other embodiments (not shown) the lubricant may be added to the guide rail in other ways, for example, the guide rail could be provided with lubricant access holes or the like that would provide lubricant to the rails that would then be smoothed into a lubricating film by the lubricant applicator 302 provided to the moving element. Further, although the embodiments herein contemplate a metal rail and polymer bearing wheels, other embodiments may include polymer rails. In particular, because of the magnetic force holding the moving element to the track, the rails are primarily used for positioning and guidance and a polymer rail (as opposed to metal rail) is anticipated to be sufficient for use in at least some embodiments.

Figure 12:
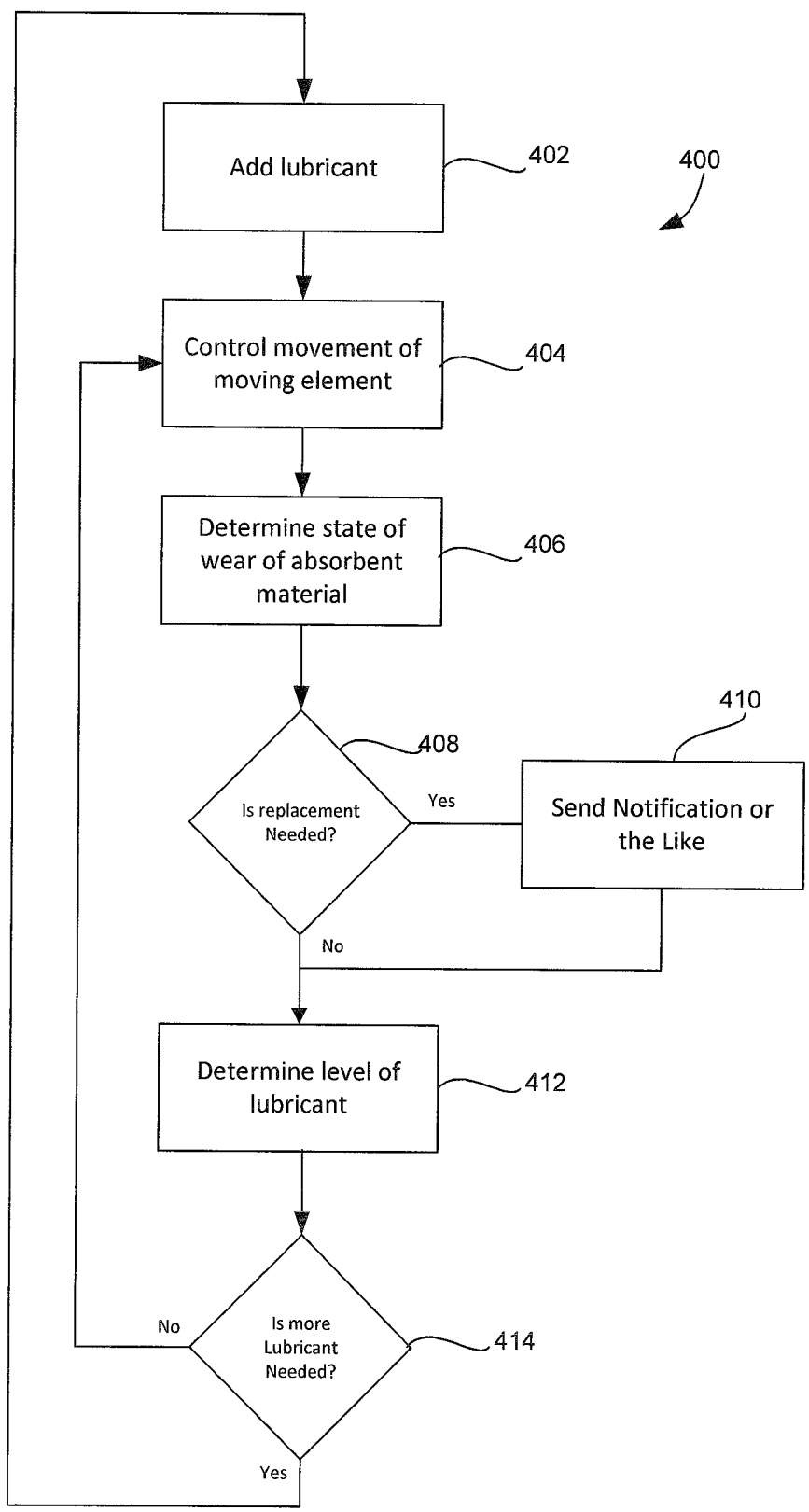
FIG. 12 is a flow chart illustrating a method of lubrication, according to an embodiment herein.

FIG. 12 is a flow chart illustrating a method of lubrication for a conveyor system. At 402, lubricant is added to the lubrication system. For example, the lubricant may be added via the lubrication port 306.

At 404, the position of the moving element 104 is controlled. The controller 200 may receive feedback on the moving element position from the moving element position sensors. The controller 200 may move each moving element 104 to an intended position to provide for further processing of an object being carried by the moving element 104. While the moving element is being moved, the lubrication system is providing lubricant to the guide rails and/or bearings. In some cases, the lubrication system includes a biasing mechanism for biasing the lubrication system against the guide rails, particularly, when the moving element is moving around a curved track.

At 406, the state of wear of the lubricant applicator 302 is determined. In some cases, there may be a sensor or other element that may indicate that the lubricant applicator 302 may need replacing. For example, the machine control software could track runtime and notify a user when the runtime exceeds a threshold indicating that the lubricant applicator 302 should be replaced. At 408, it is determined if the lubricant applicator needs to be replaced. If yes, at 410, the machine control software could send a notice to an operator, move the moving element to a replacement station, or the like. If the lubricant applicator does not need to be replaced, the method could proceed.

At 412, the level of lubricant is determined. The level of lubricant may be determined by, for example, tracking runtime against a predetermined threshold, a level sensor or fluid sensor within the lubricant system, or the like. At 414, it is determined if the moving element needs further lubrication, if so, the method returns to 402 for lubricant to be added, for example, using an automated system. If not, then the method returns to 404 to continue movement of the moving elements.

It will be understood that the state of wear of the lubricant applicator and the level of lubricant may be continuously monitored or may be monitored at pre-determined intervals. In other cases, the determination may be a trigger event wherein the controller is notified only if the wear of the lubricant applicator reaches a predetermined level or if the lubricant level falls below a certain level.

Generally speaking, embodiments of the linear motor conveyor bearing system, lubrication system and lubrication method may provide a linear motor conveyor system with a lubricating system providing a lubricating film to a shaped rail to allow shaped polymer wheels to ride on the rail with reduced wear on either or both of the wheels and the rail. In a particular case, the lubricant can be stored in an absorbent material, such as felt or the like, that contacts the rail surface to maintain the lubricating film on the rail. In some particular cases, the absorbent material may be pliable to take the shape of the rail or may be manufactured to match the shape of the rail. In other particular cases, the lubricating system may include a compliance or biasing mechanism so the absorbent material maintains contact with the rail, in particular, when travelling on both straight and curvilinear profiles. Further, the lubrication system may include a lubrication port for providing lubricant to the absorbent material or to a lubricant reservoir provided on the moving element.

In another aspect herein, there is provided a linear motor conveyor with track sections having shaped rails and moving elements having shaped polymer wheels to match with the rails and a lubrication system to provide a lubricating film on the rails so the polymer wheels and the rails have reduced wear. As noted above, the rail may not need to be hardened steel because the use of polymer wheels may reduce wear and damage such as, for example, rail peening, from the high forces of a linear motor.

It will be understood by one of skill in the art that the bearings described herein may also be formed in other ways, for example, instead of a "V" shaped wheel, a bearing may include one or more wheels having an appropriate shape. If there are more than one wheel, the wheels may either be side-by-side or in another appropriate arrangement to accomplish a similar result. Similarly, the rail could have another appropriate shape to interact with an appropriately shaped bearing wheel or wheels.

The embodiments of the conveyor system 100, conveyor bearing system and lubrication system and method may provide cost effective, precise positioning while reducing wear. With regard to the example linear motor conveyor described herein, as noted above, the first set of bearings 124 control precision on the X axis 130, the Y axis 132, the Z axis 135, and in rotation about the Y axis 132 and Z axis 135. The guide rails 109 and the second set of bearings 126 control rotation about the X axis 130 with less sensitivity to variation. The number of bearing contact points that have an influence on precision is minimized and the contact points are lubricated to reduce wear and the resultant reduction in precision that would come from wear. The magnetic force of the magnetic elements 128 is used for both thrust along the track 106 and bearing capture to keep the bearings 124, 126 biased to the guide rails 108, 109. The same magnetic elements 128 used to generate thrust along the X axis 130 of the track 106 also captures the bearings 124, 126 on the guide rails 108, 109 with the magnetic force along the Y axis 132. Other than the magnetic force along the Y axis 132, generally no other elements are needed to capture the bearings 124, 126. The magnetic force also assists with taking up backlash in the conveyor system 100. Mechanical backlash may be present between the bearings 124, 126 and the guide rails 108, 109, between the bearings 124, 126 and a shaft (not shown) supporting the bearings 124, 126 on the moving element 104. The conveyor system 100 may require fewer parts manufactured to tight tolerances than in conventional systems in order to achieve high precision movement and positioning of the moving element 104.

While the conveyor system 100 is shown with the track 106 in an upright or vertical orientation, it will be understood that the conveyor system 100 may be in any desired orientation while achieving at least one intended advantage described herein.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:

1. A linear motor conveyor system comprising:
a linear motor track comprising a first guide rail and a second guide rail, wherein the first guide rail has a shaped profile and the second guide rail has a flat profile;
at least one moving element provided to the linear motor track comprising a first bearing having a correspondingly shaped profile with a first bearing surface of polymer configured to engage the first guide rail and a second bearing having a flat profile with a second bearing surface configured to engage the second guide rail; and
a lubrication system provided to one of the track and the at least one moving element, biased against and in contact with the at least one guide rail, and configured to provide a lubricant between the first guide rail and the first bearing surface.

2. A linear motor conveyor system according to claim 1, wherein the first bearing comprises two first bearings, each of the two first bearings has a bearing surface of polymer and the first guide rail is metal.

3. A linear motor conveyor system according to claim 2, wherein the second bearing comprises two second bearings and each of the two second bearings has a bearing surface of polymer and the second guide rail is metal.

4. A linear motor conveyor system according to claim 2, wherein the lubrication system is located between the two first bearings along a direction of the first guide rail.

5. A linear motor conveyor system according to claim 1, wherein the lubrication system comprises:
a lubricant applicator provided to the at least one moving element, wherein the lubricant applicator is an absorbent material and configured to absorb a lubricant such that the lubricant is deposited on the first guide rail by contact between the absorbent material and the first guide rail; and
a biasing element to bias the lubricant applicator towards the first guide rail to maintain contact with the first guide rail.

6. A linear motor conveyor system according to claim 1, wherein the at least one moving element comprises a plurality of moving elements and the lubrication system is provided to predetermined moving elements of the plurality of moving elements.

7. A linear motor conveyor system according to claim 1, wherein the moving element is held to the linear motor track by magnetic forces.

8. A linear motor conveyor system comprising:
a linear motor track comprising at least one guide rail with a shaped profile;
at least one moving element comprising at least one bearing comprising a correspondingly shaped profile configured to engage the at least one guide rail; and
a lubrication system provided to one of the track and the at least one moving element, the lubrication system biased against and in contact with the at least one guide rail, and configured to provide a lubricant for interaction between the at least one guide rail and the at least one bearing, wherein at least one of the at least one guide rail and the at least one bearing are polymer at a point of contact between the at least one guide rail and the at least one bearing.

9. A linear motor conveyor system according to claim 8, wherein the lubrication system comprises:
a lubricant applicator provided to the at least one moving element, wherein the lubricant applicator is an absorbent material and configured to absorb a lubricant such that the lubricant is deposited on the guide rail by contact with the guide rail; and
a biasing element to bias the lubricant applicator towards the at least one guide rail to maintain contact with the at least one guide rail.

10. A linear motor conveyor system according to claim 9, wherein the lubrication system further comprises:
a lubrication port on the at least one moving element for receiving the lubricant for the lubricant applicator.

11. A linear motor conveyor system according to claim 8, wherein the at least one guide rail is polymer.

12. A linear motor conveyor system according to claim 8, wherein the at least one bearing comprises at least two bearings and the lubrication system is located between the two bearings.

13. A linear motor conveyor system according to claim 8, wherein the at least one moving element comprises a plurality of moving elements and the lubrication system is provided to predetermined moving elements of the plurality of moving elements.

14. A linear motor conveyor system according to claim 8, wherein the lubrication system is provided to the track and configured such that a lubricant from the lubrication system is provided to the at least one guide rail and the at least one bearing by movement of the moving element.

15. A linear motor conveyor system according to claim 8, wherein the at least one guide rail and the at least one bearing engage such that the at least one bearing is held against the at least one guide rail primarily by magnetic forces between the moving element and the track.

16. A linear motor conveyor system according to claim 8, wherein:
the at least one guide rail comprises a first guide rail and a second guide rail, wherein the first guide rail is shaped and the second guide rail is flat and the guide rails are parallel and at a predetermined distance from one another; and
the at least one bearing comprises a first set of bearings and a second bearing, wherein the first set of bearings comprises two bearings that are in spaced arrangement on the moving element along the direction of the first guide rail and are positioned and shaped to engage with the first guide rail and the second bearing is flat and positioned to engage with the second guide rail.

17. A linear motor conveyor system according to claim 16, wherein the second bearing comprises two bearings in spaced arrangement on the moving element along the direction of the second guide rail.

18. A method of lubricating a linear motor conveyor system, the method comprising:
adding lubricant to a lubrication system provided to a moving element of a linear motor conveyor system, wherein the moving element comprises at least one bearing having a polymer bearing surface and the lubrication system comprises a lubricant applicator configured to absorb the lubricant;
biasing the lubricant applicator toward and in contact with a guide rail of a track of the linear motor conveyor system; and
determining when the lubricant needs to be replenished and, if so, moving the moving element to a lubricant replenishment station and automatically adding lubricant.

19. A method of lubricating a linear motor conveyor system according to claim 18, wherein the determining comprises calculating if an operating time of the moving element exceeds a predetermined threshold.

\* \* \* \* \*